United States Patent
Baert et al.

(10) Patent No.: US 9,611,659 B2
(45) Date of Patent: Apr. 4, 2017

(54) PANEL SUITABLE FOR ASSEMBLING A WATERPROOF FLOOR OR WALL COVERING, METHOD OF PRODUCING A PANEL

(71) Applicant: Champion Link International Corporation, The Valley (AI)

(72) Inventors: Thomas Luc Martine Baert, Sint-Martens-Latem (BE); Anthony Drevet, Jiaxing (CN); Tom Van Poyer, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 14/746,006

(22) Filed: Jun. 22, 2015

(65) Prior Publication Data

US 2015/0368912 A1   Dec. 24, 2015

(30) Foreign Application Priority Data

Jun. 20, 2014 (NL) ........................................ 2013046
Jun. 19, 2015 (EP) .................................... 15173002

(51) Int. Cl.
*E04B 5/00* (2006.01)
*E04F 15/02* (2006.01)
(Continued)

(52) U.S. Cl.
CPC ........ *E04F 15/02188* (2013.01); *B32B 5/245* (2013.01); *B32B 23/048* (2013.01);
(Continued)

(58) Field of Classification Search
CPC ..... B32B 5/245; B32B 23/048; B32B 27/065; B32B 29/007; E04F 13/077;
(Continued)

(56) References Cited

U.S. PATENT DOCUMENTS 1,793,666 A  *  2/1931  Baldwin ............. D06N 7/0028
                                                       156/315
3,847,724 A  *  11/1974  Powers ................... E04C 2/284
                                                       156/60
(Continued)

FOREIGN PATENT DOCUMENTS

CN           100419019 C      9/2008
EP           1262607 A1     12/2002
(Continued)

*Primary Examiner* — Carles A Fox
*Assistant Examiner* — James Buckle, Jr.
(74) *Attorney, Agent, or Firm* — The Webb Law Firm

(57) ABSTRACT

Panel suitable for assembling a waterproof floor or wall covering by interconnecting a plurality of said panels with each other, wherein the panel has a substantially planar top surface, and a substantially planar bottom surface, at least four substantially linear side edges comprising at least one pair of opposite side edges which are provided with interconnecting coupling means for interconnecting one panel within another, the panel having a sandwich structure which comprises a central layer basically composed of a thermoplastic material, a rigid top layer and a rigid bottom layer.

14 Claims, 1 Drawing Sheet

(51) Int. Cl.
*B32B 29/00* (2006.01)
*E04F 15/10* (2006.01)
*B32B 23/04* (2006.01)
*E04F 13/077* (2006.01)
*E04F 13/08* (2006.01)
*B32B 5/24* (2006.01)
*B32B 27/06* (2006.01)

(52) U.S. Cl.
CPC .......... *B32B 27/065* (2013.01); *B32B 29/007* (2013.01); *E04F 13/077* (2013.01); *E04F 13/0871* (2013.01); *E04F 13/0875* (2013.01); *E04F 13/0894* (2013.01); *E04F 15/02038* (2013.01); *E04F 15/102* (2013.01); *E04F 15/105* (2013.01); *E04F 15/107* (2013.01); *B32B 2255/12* (2013.01); *B32B 2255/26* (2013.01); *E04F 2201/0153* (2013.01); *E04F 2201/023* (2013.01); *E04F 2201/043* (2013.01); *E04F 2290/00* (2013.01)

(58) Field of Classification Search
CPC .............. E04F 13/0871; E04F 13/0875; E04F 13/0894; E04F 15/102; E04F 15/105; E04F 15/107; E04F 15/02038; E04F 15/02188; E04F 2201/0153; E04F 2201/023; E04F 2201/043; E04F 2290/00
USPC ....... 52/309.15, 506.01, 588.1, 592.1, 592.4; 156/182
See application file for complete search history.

(56) References Cited

U.S. PATENT DOCUMENTS

| | | | |
|---|---|---|---|
| 5,985,457 A * | 11/1999 | Clifford | B32B 15/08 156/163 |
| 6,440,538 B1 * | 8/2002 | Ungar | B32B 27/04 428/143 |
| 6,688,061 B2 | 2/2004 | Garcia | |
| 8,071,193 B2 * | 12/2011 | Windmoller | B32B 3/02 428/192 |
| 8,728,603 B2 * | 5/2014 | Windmoller | B32B 27/12 156/182 |
| 2009/0145066 A1 * | 6/2009 | Pervan | B27N 3/007 52/309.15 |
| 2011/0296780 A1 | 12/2011 | Windmoller | |
| 2012/0103722 A1 * | 5/2012 | Clausi | B32B 25/14 181/294 |
| 2012/0276348 A1 | 11/2012 | Clausi et al. | |
| 2013/0067842 A1 * | 3/2013 | Meersseman | B32B 7/12 52/309.4 |
| 2015/0121793 A1 * | 5/2015 | Segaert | B29C 70/081 52/506.01 |
| 2015/0233127 A1 | 8/2015 | Dohring | |

FOREIGN PATENT DOCUMENTS

| | | |
|---|---|---|
| WO | 2013139681 A1 | 9/2013 |
| WO | 2014053186 A1 | 4/2014 |
| WO | 2015060778 A1 | 4/2015 |

* cited by examiner

PANEL SUITABLE FOR ASSEMBLING A WATERPROOF FLOOR OR WALL COVERING, METHOD OF PRODUCING A PANEL

CROSS REFERENCE TO RELATED APPLICATION

This application claims priority to Netherlands Patent Application No. 2013046 filed Jun. 20, 2014, the disclosure of which is hereby incorporated in its entirety by reference.

BACKGROUND OF THE INVENTION

Field of the Invention

The invention relates in a first aspect, to a panel suitable for assembling a waterproof floor or wall covering by interconnecting a plurality of said panels with each other, wherein the panel has a substantially planar top surface, and a substantially planar bottom surface, at least four substantially linear side edges comprising at least one pair of opposite side edges which are provided with interconnecting coupling means for interconnecting one panel within another.

The invention relates in a second aspect to a method of producing a panel according to the first aspect of the invention.

Description of the Related Art

In the field of floor and wall coverings, panels are widely used based on wood materials or derivatives thereof, especially as a material for the main or central layer of the panel. An example is given in U.S. Pat. No. 6,688,061. A major disadvantage is the hygroscopic nature of such materials, which affects the lifetime and durability of such panels. As an alternative several thermoplastic materials such as polyvinyl chloride is used, which while being water resistant, present other disadvantages. Polyvinyl chloride that is used for panels such as in patent CN 100419019, has a flexible quality which requires a perfectly smooth and even surface of the substrate on which the panel covering is applied. If such is not the case, any unevenness will be visible through the panel as it conforms with the underlying substrate surface, which is a detrimental effect from an aesthetic point of view to the user. Furthermore, the upper surface of the panel is less durable because the scratch resistance of the polyvinyl chloride is relatively low. Finally, the flexibility of the panel is cumbersome in regard of installing a covering of interconnected panels, because the assembling of the mutual interconnecting coupling means is more difficult when these can bend away from each other.

In short, there is a general need in the field to develop a panel which while having waterproof properties, also is sufficiently rigid and resistant to wear and tear. In addition, the panel to be developed should be sufficiently light in weight.

It is an objective of the invention to meet the above general need, and thus take away completely or in part, one or more of the disadvantages related to the panels known from the prior art.

SUMMARY OF THE INVENTION

The above objective of the invention, is met by the provision of a panel according to the above preamble, wherein the panel has a sandwich structure which comprises a central layer basically composed of a thermoplastic material, a rigid top layer and a rigid bottom layer wherein the panel is rigid. The thickness of the panel according to the invention is preferably 8 mm, or smaller.

The thermoplastic material for the central layer has waterproof properties and is not hygroscopic as such. The material contributes to the light weight of the panel. The rigid top layer and rigid bottom layer take away the disadvantages relating to flexible panels. Typically, the panel has a square or rectangular shape.

Preferably, in the panel according to the invention, the central layer is flexible as in contrast to the rigid top layer and rigid bottom layer.

The overall rigidity of the panel according to the invention is preferably above 35 N/mm2 according to the test method described in the European norm EN-310. In this way, the panel according to the invention can be qualified as having rigid properties.

Preferably the panel according to the invention, comprises two pairs of opposite side edges which are provided with interconnecting coupling means. As such a 'floating' covering can be assembled by interconnecting the individual panels with each other at all four sides without the need of further coupling means such as adhesives.

It is further preferred in the panel according to the invention, that the interconnecting coupling means comprise a tongue and a groove wherein the tongue is provided on one side edge of one pair of opposite side edges, and the groove is provided on the other side edge of the same pair of opposite side edges. Such a design of coupling means is well-known in the art and has proven highly suitable for panels for floating floors.

In the panel according to the invention it is preferred that the interconnecting coupling means have an interlocking feature which avoids free movement of interconnected panels. Such an interlocking feature may be a projection and a respective recess provided on the respective opposite side edges by which neighbouring panels interlock with each other.

It is preferred in the panel according to the invention that the thermoplastic material comprises polyvinyl chloride and/or polyethylene. Both have proven highly suitable for its use as main component for the central layer.

In particular, it is preferred in the panel according to the invention that the thermoplastic material has a foam structure. The foam structure consists basically of a thermoplastic matrix in which closed and/or open cells are present. The foam structure is typically obtained by adding blowing agents to the thermoplastic melt, before it is formed and hardened into its final shape. As the foam structure has a lower density than a solid structure, the weight of the central layer is further reduced which is advantageous for the panel. The foam structure has furthermore the inherent property of better sound dampening properties than a solid structure, which provides a further attractive property to the panel.

Another preferred feature of the panel according to the invention is that the rigid top layer and/or the rigid bottom layer each comprise at least one ply of a cellulose-based layer and a cured resin. Such a ply has proven to be sufficiently rigid and impact resistant for its function in the invention. Furthermore, such a ply has suitable waterproof properties.

With particular preference, the cellulose-based layer in the panel according to the invention is paper. The paper used is preferably regular paper. As an alternative Kraft paper may be used although it offers less rigidity to the ply.

Advantageously, the cured resin in the panel according to the invention comprises a melamine resin and/or a phenolic resin. Melamine is preferably used because it offers more rigidity to the ply.

It is preferred in the panel according to the invention that the rigid top layer and/or the rigid bottom layer comprise more than one ply of a cellulose-based layer and a cured resin. The rigidity of the panel envisaged can be adapted in this way, as a larger number of plies contributes to a higher rigidity.

With special preference in the panel according to the invention, the rigid top layer comprises seen from the upper surface of the panel, a first and second ply of a cellulose-based layer and a cured resin, wherein the cellulose-based layer of the second ply has a decorative surface. As such, the panel is provided with the required surface properties of a decorative pattern or color, as well as an impact resistant top surface.

In the panel according to the invention, preferably the rigid top layer comprises seen from the upper surface of the panel, a third and fourth ply of a cellulose-based layer and a cured resin, wherein the cellulose-based layer of the third and fourth ply each contain fibers oriented in a main direction, wherein the main direction of the cellulose-based layer of the third ply differs from the main direction of the cellulose-based layer of the fourth ply, preferably by an angle in the range of 45 to 135 degrees, more preferably in the range of 80 to 100 degrees. The third and fourth ply contribute additional rigidity, not only by their additional number, but also because their main direction of fibers is different. Moreover, the third and fourth ply offer additional impact strength to the top layer.

With further preference in the panel according to the invention, the plies of the rigid top layer and/or the plies of the rigid bottom layer form a laminate which is obtained by lamination under high pressure.

Typically, the lamination process involves a pressure of 10 to 18 MPa under which at least two plies of a cellulose-based layer impregnated with resin are laminated. Advantageously, the lamination process is performed at a temperature between 150 and 180° C. Under such circumstances, the curing may be completed within 30 to 120 seconds.

This makes it possible to use a common short cycle press in the process, whereas conventional high pressure lamination (HPL) processes require a lower temperature, from about 120 to about 150° C. and a longer pressing time, from 30 min to 45 min, and consequently require the use of a multilayer daylight press.

Preferably in the panel according to the invention, the central layer is an extruded sheet material. Such a layer is easily produced, and the extrusion process is suitable for the formation of a sheet having a foam structure.

It is further preferred in the panel according to the invention, that the central layer is provided on its top side and on its bottom side with an adhesive layer, which preferably comprises a waterproof adhesive. In the process of producing the sandwich structure of the panel, the rigid bottom and top layer are expediently fixed on the central layer, by an adhesive layer. In regard of the envisaged waterproof properties of the panel, a waterproof adhesive is preferably used.

In another preferred embodiment of the panel according to the invention, the first ply of the rigid top layer contains abrasion resistant particles, and/or its top surface is provided with a relief pattern. Both features contribute to the intended use of the panel for a floor or wall covering.

Especially when the top layer is produced by the above lamination process, a single press machine can be used which makes it cost efficient to use a press plate with matching embossing for each decorative pattern in order to obtain a relief pattern on the top surface of the panel that matches the decorative pattern.

As an alternative to the above features, the rigid bottom layer of the panel according to the invention, comprises a ply basically composed of a polyvinyl chloride or of a nonwoven fabric. Dependent on the specific configuration of the top layer, such a bottom layer may be sufficient for the intended use.

It is preferred in the panel according to the invention, that the central layer basically is composed of a thermoplastic material which contains one or more filler materials chosen from the group comprising calcium carbonate, wood dust, bamboo dust, rubber, cork, straw, and paper, wherein preferably the total ratio of filler material in the central layer is 30 wt. % or higher. The filler material imparts rigidity to the central layer.

Preferably, in the panel according to the invention, the rigid bottom layer is provided on its bottom side with a cushioning layer of one or more materials chosen from the group comprising cork, rubber, a solid foam material, polyethylene and ethylene vinyl acetate. The cushioning layer may compensate further for any unevenness on the substrate surface on which the panels are applied. Furthermore, the cushioning layer attributes a sound dampening effect to the panel.

With further preference, in the panel according to the invention, the rigid top layer is provided on its bottom side with a buffer layer of one or more materials chosen from the group comprising cork, rubber, a solid foam material, vinyl, polyethylene and ethylene vinyl acetate. The buffer layer imparts some shock absorbing qualities to the panel in case of a heavy impact on the top surface of the panel. Furthermore, the buffer layer attributes a sound dampening effect to the panel.

A special aspect of the invention relates to a waterproof floor or wall covering composed of a plurality of interconnected panels, wherein the panels are conform the first aspect of the invention. Such a covering profits from the same advantages as set out already above.

In a second aspect, the invention relates to a method of producing a panel according to the first aspect of the invention
comprising the steps of
a) providing a central layer basically composed of a thermoplastic material,
b) curing a top layer comprising at least two plies of a cellulose-based layer impregnated with resin under a pressure of 10 to 18 MPa,
c) curing a bottom layer comprising at least one ply of cellulose-based layer impregnated with resin,
d) adhering the cured bottom layer on the bottom side of the central layer, and adhering the cured top layer on the top side of the central layer.

The method according to the invention provides a new and expedient way to provide a panel according to the first aspect of the invention.

Preferably the curing in step b) is performed at a temperature between 150 and 180° C. Under such circumstances, the curing may be completed within 30 to 120 seconds.

The last step d) of adhering the bottom and top layer to the central layer, can for instance be carried out as follows:

i) applying adhesive on both sides of the central layer and pressing the bottom and top layer subsequently onto the respective adhesive layers, ii) the same as i) but in addition applying heat while pressing, iii) using polyurethane reactive (PUR) as an adhesive which is heated and applied on both sides of the central layer, and pressing the bottom and top layer subsequently onto the respective adhesive layers.

In the method according to the invention, preferably at least two plies of the top layer contain a cellulose-based layer impregnated with at least 70 to 130 wt. % resin. Such an amount of resin relative to the cellulose-based layer, has proven effective in achieving the advantageous properties of the top layer of the panel. With particular preference, the first ply of the top layer contains a cellulose-based layer impregnated with an increased amount of resin, which is 150 to 250 wt. %.

Furthermore, in the method according to the invention, preferably the cellulose-based layers of two plies of the top layer contain fibers oriented in a main direction, wherein the main direction of the cellulose-based layer of one ply differs from the main direction of the cellulose-based layer of the other ply, preferably by an angle in the range of 45 to 135 degrees, more preferably in the range of 80 to 100 degrees.

The following dimensions and properties are preferred for the panel according to the invention:
  overall thickness of the panel: 4-5.5 mm
  thickness of the rigid top and bottom layer approx. 0.5 mm
  thickness of the central layer approx. 4 mm
  overall width of the panel: 120-300 mm
  overall length of the panel: 300-2500 mm
  In respect of the central layer of polyvinyl chloride with a foam structure the following properties are preferred:
  pore size: 0.01 to 0.15 mm
  pore volume: 20-50%
  density: 750-1200 kg/m3
  inherent viscosity: 0.6 to 0.84

BRIEF DESCRIPTION OF THE DRAWINGS

The invention will be further explained with reference to the appended figures wherein.

DETAILED DESCRIPTION OF THE PREFERRED EMBODIMENTS

Figure 1:
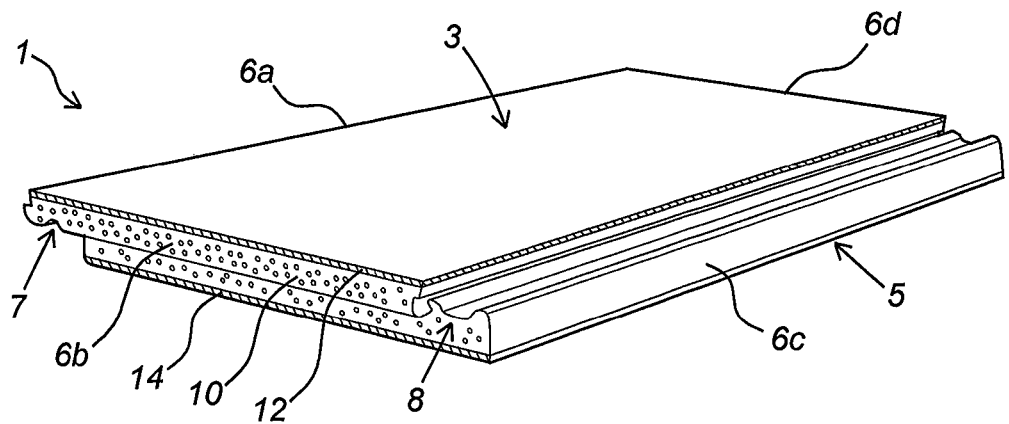
FIG. 1 shows in perspective a preferred embodiment of the panel according to the invention.

FIG. 1 shows a panel 1 suitable for assembling a waterproof floor or wall covering by interconnecting a plurality of said panels with each other, wherein the panel has a substantially planar top surface 3, and a substantially planar bottom surface 5, at least four substantially linear side edges 6a,6b,6c,6d comprising at least one pair of opposite side edges 6a,6c which are provided with interconnecting coupling means 7,8 for interconnecting one panel within another, the panel having a sandwich structure which comprises a central layer 10 basically composed of a thermoplastic material, a rigid top layer 12 and a rigid bottom layer 14.

Figure 2:
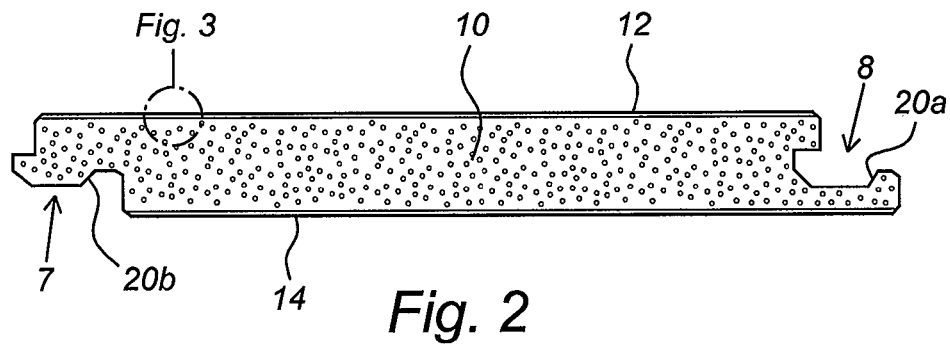
FIG. 2 shows a cross section of the preferred embodiment of the panel according to the invention.

FIG. 2 shows the same embodiment as FIG. 1 in cross-section, wherein the interconnecting coupling means 7,8 comprise a tongue 7 and a groove 8, each having an interlocking feature 20a (a projection) and 20b (a recess) which avoids free movement of interconnected panels when the tongue of one panel is inserted in the groove of another neighbouring panel.

The central layer 10 is composed of a foam structure based on polyvinylchloride, wherein no wood dust is contained. The rigid top layer 12 and the rigid bottom layer 14 has the form of a laminate of plies of a cellulose-based layer and a cured resin. The laminate is obtained by lamination under high pressure, according to the high pressure laminate process.

Figure 3:
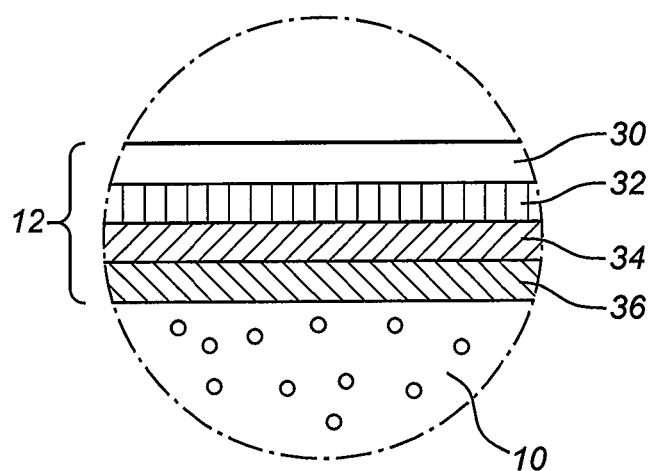
FIG. 3 shows in more detail a cross section the sandwich structure of the preferred embodiment of the panel according to the invention.

An enlarged picture of the laminate structure of the top layer 12 indicated in the circle in FIG. 2, is shown in FIG. 3.

FIG. 3 shows a part of the central layer 10 provided with the rigid top layer 12 in cross section, wherein the top layer 12 is composed of the following plies:
  a first ply 30 of a paper layer and a cured melamine resin,
  a second ply 32 of a paper layer and a cured melamine resin, wherein the paper layer of the second ply is provided with a decorative pattern,
  a third ply 34 of a paper layer containing fibers oriented in a main direction and a cured melamine resin,
  a fourth ply 36 of a paper layer containing fibers oriented in a main direction and a cured melamine resin.

The main direction of the paper layer of the third ply differs from the main direction of the paper layer in the fourth ply, by an angle of approx. 90 degrees.

The laminate structure of the rigid bottom layer is not shown, but may for instance be a same structure as the third and fourth ply of the rigid top layer. As an alternative, the rigid bottom layer may be formed out of only one ply of a paper layer and a cured melamine resin.

The invention claimed is:

1. A panel suitable for assembling a waterproof floor or wall covering by interconnecting a plurality of said panels with each other,
  wherein the panel has a substantially planar top surface, and a substantially planar bottom surface, at least four substantially linear side edges comprising at least one pair of opposite side edges which are provided with interconnecting coupling means for interconnecting one panel within another, comprising two pairs of opposite side edges which are provided with interconnecting coupling means
  the panel having a sandwich structure which comprises a flexible central layer basically composed of a thermoplastic material, a rigid top layer and a rigid bottom layer,
  wherein the panel is rigid and has a thickness of 8 mm or smaller, and
  wherein the rigid top layer comprises two plies of cellulose-based layer and a cured resin, wherein the cellulose-based layer of both plies each contain fibers oriented in a main direction, wherein the main direction of the cellulose-based layer of one ply differs from the main direction of the cellulose-based layer of the other ply.

2. The panel according to claim 1, wherein the overall rigidity of the panel is above 35-N/mm2 according to the test method described in the European norm EN-310.

3. The panel according to claim 1, wherein the thermoplastic material has a foam structure obtained by an extrusion process.

4. The panel according to claim 1, wherein the cellulose-based layer is paper.

5. The panel according to claim 4, wherein the cellulose-based layer is kraft paper.

6. The panel according to claim 1, wherein the cured resin comprises at least one of a melamine resin and a phenolic resin.

7. The panel according to claim 1, wherein the rigid top layer contains abrasion resistant particles, and/or its top surface is provided with a relief pattern.

8. The panel according to claim 1, wherein the rigid top layer is provided on its bottom side with a buffer layer of one or more materials chosen from the group comprising cork, rubber, a solid foam material, vinyl, polyethylene and ethylene vinyl acetate.

9. The panel according to claim 1, wherein the rigid bottom layer comprises a ply basically composed of a polyvinyl chloride or of a non-woven fabric.

10. A waterproof floor or wall covering composed of a plurality of panels according to claim 1, which panels are interconnected.

11. A method of producing an interconnectable panel, for a waterproof floor or wall covering, comprising the steps of:
   a) providing a central layer basically composed of a thermoplastic material,
   b) curing a top layer comprising two plies of a cellulose-based layer impregnated with a cured resin under a pressure of 10 to 18 MPa,
   c) curing a bottom layer comprising at least one ply of cellulose-based layer impregnated with resin, and
   d) adhering the cured bottom layer on the bottom side of the central layer, and adhering the cured top layer on the top side of the central layer to create a rigid interconnectable panel,
   wherein the cellulose-based layer of both plies each contain fibers oriented in a main direction, wherein the main direction of the cellulose-based layer of one ply differs from the main direction of the cellulose-based layer of the other ply.

12. The method according to 11, wherein at least two plies of the top layer contain a cellulose-based layer which is impregnated with at least 70 to 130 wt. % resin.

13. The panel according to claim 1, wherein the main direction of the cellulose-based layer of the one ply differs from the main direction of the cellulose-based layer of the other ply by an angle in the range of 45 to 135 degrees.

14. The panel according to claim 13, wherein the main direction of the cellulose-based layer of the one ply differs from the main direction of the cellulose-based layer of the other ply by an angle in the range of 80 to 100 degrees.

* * * * *